United States Patent [19]

Mattei et al.

[11] Patent Number: 4,805,664

[45] Date of Patent: Feb. 21, 1989

[54] SPA VALVE

[76] Inventors: Spartaco F. Mattei; Gerard Brune, both of 3 Parin Road, Parow Industria, Parow, South Africa

[21] Appl. No.: 145,731

[22] Filed: Jan. 15, 1988

Related U.S. Application Data

[63] Continuation of Ser. No. 892,386, Jul. 31, 1986, abandoned.

[30] Foreign Application Priority Data

Aug. 1, 1985 [ZA] South Africa .......................... 85/5804

[51] Int. Cl.$^4$ .......................... F16K 15/02; B05B 1/22; A61H 33/02

[52] U.S. Cl. .......................... 137/543.23; 4/542; 239/570; 239/600

[58] Field of Search .................... 4/542, 543, 492, 568, 4/569; 137/356, 540, 542, 543.23; 239/570, 600

[56] References Cited

U.S. PATENT DOCUMENTS

| | | | |
|---|---|---|---|
| 1,011,147 | 12/1911 | Bennett | 137/543.23 |
| 3,580,275 | 5/1971 | Hanson . | |
| 4,349,923 | 9/1982 | Chalberg | 4/542 |
| 4,368,550 | 1/1983 | Stevens | 4/542 X |
| 4,387,854 | 6/1983 | Dupont | 4/492 X |
| 4,420,022 | 12/1983 | Landry | 137/540 X |

FOREIGN PATENT DOCUMENTS

| | | | |
|---|---|---|---|
| 501420 | 4/1954 | Canada | 137/540 |
| 263188 | 3/1929 | Italy | 137/540 |
| 424102 | 8/1935 | United Kingdom | 137/540 |
| 704560 | 2/1954 | United Kingdom | 137/543.23 |
| 756162 | 8/1956 | United Kingdom . | |
| 840559 | 7/1960 | United Kingdom . | |
| 909405 | 10/1962 | United Kingdom . | |
| 1061394 | 3/1967 | United Kingdom . | |
| 2107180 | 4/1983 | United Kingdom . | |
| 2114021 | 8/1983 | United Kingdom . | |
| 2139491 | 11/1984 | United Kingdom . | |

*Primary Examiner*—Robert G. Nilson

*Attorney, Agent, or Firm*—Ladas & Parry

[57] ABSTRACT

An air injector valve for a spa is disclosed, the valve including a body and a cap. Within the body there is a valve seat and a jumper which co-operates with the valve seat to control flow of air through the valve. The body has an externally threaded section which screws, from above, into a nut positioned below an aperture in the shell of the spa. A flange at the upper end of the body prevents the valve body passing right through the aperture in the shell. The cap can be unscrewed from the body and, once this has been removed, access to the spring and jumper from within the spa is possible. The valve body cannot fall through the aperture in the shell as it remains supported by the flange.

6 Claims, 1 Drawing Sheet

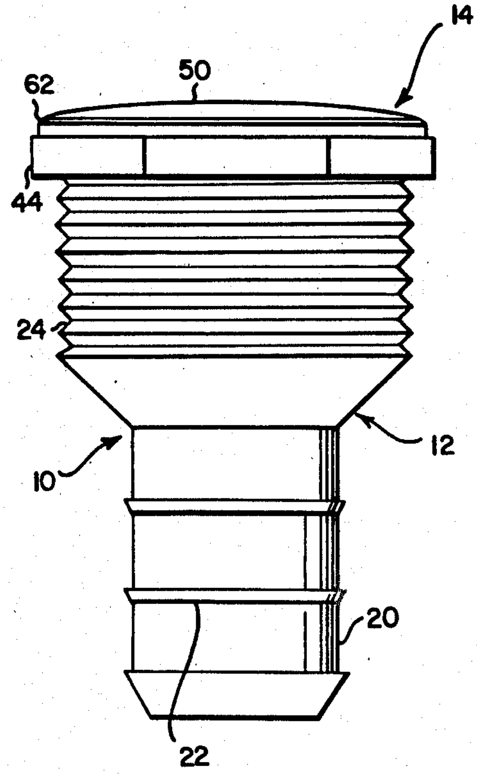
FIG. 1
FIG. 2
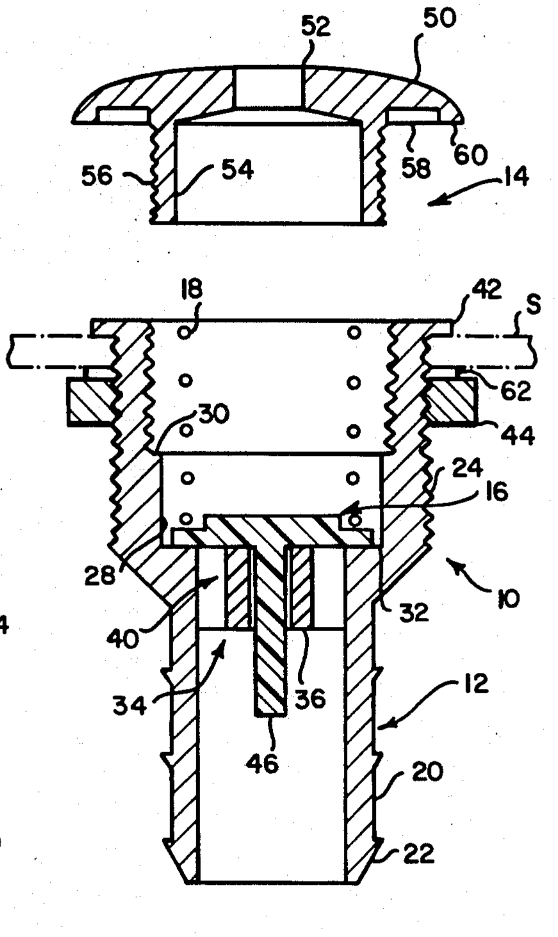
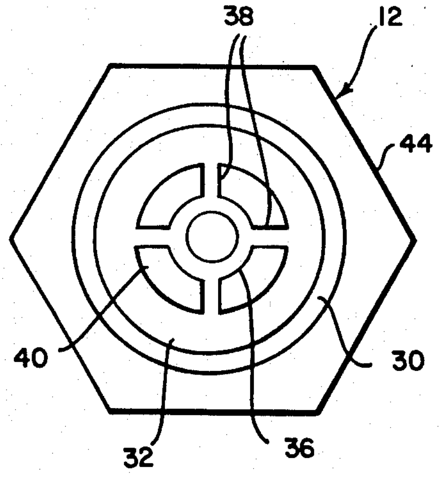
FIG. 3

SPA VALVE

This is a continuation of co-pending application Ser. No. 892,386, filed on July 31, 1986, now abandoned.

This invention relates to air injector valves for use in spas.

Home spas have become very popular, these generally consisting of a shell of fibreglass or sheet synthetic plastics material which is large enough to take two or more people. Quite often the shell is shaped so as to provide submerged seating for the occupants. The shell can be sunk into the floor or built-into a raised platform. The shell has a plurality of small openings therein, the openings generally being in the base of the shell but sometimes additionally being in the sides. An air injector valve is mounted in each of these openings, the valves normally being closed.

A drive motor and air pump are provided, the pump being connected to a distributor and piping being provided for feeding air under pressure from the distributor to the valves.

Another form of spa consists of an ordinary bath tub with openings in it which receive air injector valves. With the air supply switched off, the valves remain closed and the bath can be used simply for bathing purposes. When air is supplied the bath can be used for hydrotherapy.

During use of the spa or bath tub, it is not impossible for foreign matter to get into the valves. This can cause faulty operation, the result normally being that the valve 'sticks' in the open position. This means that there is now no control over flow of air or water through the valve in either direction.

In no system of which applicants are aware is access to the valves for the purpose of cleaning and repairing them provided.

The main object of the present invention is to provide an air injector valve for a spa, which valve can be cleaned and serviced from within the spa itself.

According to the present invention there is provided an air injector valve for a spa, the valve comprising a body having an externally threaded section and, above the threaded section, a section which is of larger transverse dimensions than the threaded section, the underface of the larger section forming a valve support surface, a valve seat within the body, a cap which is releasably secured to the upper end of the body, and a valve jumper within the body, said jumper co-operating with said valve seat and being in a chamber which is bounded partly by said body and partly by the cap, the jumper being removable from said chamber once said cap has been detached from the body.

Said cap preferably comprises an externally threaded sleeve and said chamber of the body is bounded by an internally threaded section, said sleeve screwing into said internally threaded section. In this form said cap can have a dome-shaped portion, said sleeve protruding downwardly from the underside of said portion and there being a non-circular opening in said dome-shaped portion.

For a better understanding of the present invention reference will now be made, by way of example, to the accompanying drawings in which:

FIG. 1 is an elevation of an air injector valve;

FIG. 2 is a vertical section through the valve of FIG. 1, a cap of the valve being shown detached and part of the spa shell also being illustrated; and FIG. 3 is a top plan view of the body and lock nut of the valve.

The air injector valve illustrated is generally designated 10 and comprises a body 12, a cap 14, a jumper 16, and a spring 18.

The body 12 is a one piece injection moulding and comprises a spigot 20 which has circumferentially extending ribs 22 on the outer surface thereof. A hose (not shown) of rubber or synthetic plastics material is, in use, pushed onto the spigot 20, the ribs 22 preventing the hose pulling-off. This hose leads to the valve from an air distributor (not shown) which is itself connected to a pump (not shown). Above the spigot 20 the body 12 flares out and is externally screw threaded. The screw threading is designated at 24. The upper part of the body 12 is internally stepped thereby to provide an internally threaded upper section 26 and a plain lower section 28. The lower section 28 is of smaller diameter than the upper section 26 and there is a step 30 between them. At the lower end of the section 28 there is a circular valve seat 32. Between the section 28 and the hollow interior of the spigot 20 there is a guide structure 34 for the jumper 16. The guide structure 34 comprises a sleeve 36 which is joined by four ribs 38 (see particularly FIG. 3) to the remainder of the body 12. Flow passages 40 are provided between the ribs 38.

At the upper end of the body 12 there is an outwardly protruding flange 42. Screwed onto the external screw threading 24 is a lock nut designated 44. The nut 44 is larger in transverse dimensions than the flange 42.

The jumper 16 comprises a stem 46 and a disc-like head 48, the head having a raised central section which forms a seat for the spring 18.

The upper portion 50 of the cap 14 is dome-like and there is a central opening 52. The opening 52 is non-circular and a five sided opening suitable for receiving an Allen key is preferred. A sleeve 54 depends from the underside of the domed portion 50, the sleeve 54 being externally threaded. The threading of the sleeve 54 is shown at 56 and is compatible with the internal threading of the upper section 26.

A circumferentially extending recess 58 is provided in the underside of the domed portion 50, the recess 58 encircling the sleeve 54. Outwardly of the recess 58 there is an annular surface 60.

In FIG. 1 the nut 44 is shown at the top of the threading 24 with a sealing ring 62 between the nut 44 and the flange 42. The ring 62 is not shown in FIG. 3.

When the sleeve 54 of the cap 14 is screwed into the upper section 26, the recess 58 receives the flange 42. The spring 18 bears on the top face of the head 48 of the jumper 16 and on the underside of the domed portion 50 of the cap 14.

The shell S (FIG. 3) of the spa or bath tub has an aperture therein. To fit the valve 10, the nut 44 is screwed off the body 12 and the sealing ring 62 is also removed. The body 12 of the valve is pushed, with the spigot 20 leading, through the aperture in the shell S from above and rotated, the nut 44 and ring 62 having been placed against the underside of the shell in register with the aperture. The body 12 is thus screwed into the nut 44. The valve body 12 is screwed down until the flange 42 engages the shell S. A small amount of sealant can be applied between the flange 42 and the shell S. The ring 62 is gripped between the nut 44 and the underside of the shell S.

When air under pressure is supplied through the hose connected to the spigot 20, the jumper 16 is lifted so that the disc-like head 48 separates from the seat 32. Air can then flow through the passages 40 into the sections 26, 28 and then through the opening 52 into the spa. As soon as the supply of air is switched off, the jumper 16 is urged by the spring 18 back to the position in which it seals-off the spa from the hose.

Should foreign matter get between the seat 32 or the guide structure 34 and the disc-like head 48, the head 48 will not seat properly. The valve is then permanently open and not only is the desired pulsating effect lost, but in addition water can flow from the spa into the piping system when the air supply is switched off.

To gain access to the jumper 16, it is necessary to unscrew the cap 14. As soon as the cap 14 has been removed, access to the jumper 16 and spring 18 can be had through the section 26. The jumper 16 can be lifted out and it, the seat 32 and the guide structure 34 cleaned. The body 12 remains supported by the shell of the spa. More specifically the underface of the flange 42 remains supported by the top face of the shell S.

We claim:

1. An air injector valve for a spa, the valve comprising a body having an internally threaded section and an externally threaded section, a support section above the externally threaded section, said support section being of larger transverse dimensions than the externally threaded section, the underface of the larger section forming a valve support surface and the part of the body below said externally threaded section being of smaller transverse dimensions than the support section whereby the valve body can be passed downwardly through an aperture in a spa shell until said underface of the support section engages said shell, a valve seat within the body at a level below said underface, a cap which is releasably secured to the upper end of the body, said cap comprising an externally threaded sleeve which screws into said internally threaded section, and said cap further comprising an externally threaded sleeve which screws into said internally threaded section, and said cap further comprising a dome-shaped portion, said sleeve protruding downwardly from the underside of said dome-shaped portion and there being a non-circular opening in said dome-shaped portion, and a valve jumper within the body, said jumper being below said surface, co-operating with said valve seat and being in a chamber which is bounded partly by said body and partly by the cap, the jumper being removable through the open upper end of said chamber once said cap has been detached from the body.

2. A valve as claimed in claim 1, wherein there is a spring between said dome-shaped portion and said jumper.

3. A valve as claimed in claim 2, wherein said jumper includes a stem and a head at the upper end of the stem, the spring bearing on the top face of said head and the underface of said head bearing on said valve seat.

4. A valve as claimed in claim 3, wherein said body includes a central sleeve which is joined by radial ribs to the remainder of said body, there being passages between said ribs, said stem being in said sleeve and said head closing-off the upper ends of said passages when said head is in engagement with said valve seat.

5. A valve as claimed in claim 2, and which includes a hollow spigot extending downwardly from said threaded section said spigot having circumferentially extending external ribs.

6. A valve as claimed in claim 1, and further including a nut screwed onto said threaded section.

* * * * *